P. R. GLASS.
FOLDING MACHINE.
APPLICATION FILED JAN. 13, 1910.

1,224,529.

Patented May 1, 1917.
7 SHEETS—SHEET 1.

Witnesses:
Inventor:
P. R. Glass
Attorneys.

P. R. GLASS.
FOLDING MACHINE.
APPLICATION FILED JAN. 13, 1910.

1,224,529.

Patented May 1, 1917.
7 SHEETS—SHEET 6.

Witnesses:
F. R. Pentstone

Inventor:
P. R. Glass
by Wright, Brown, Quinby May
Attorneys.

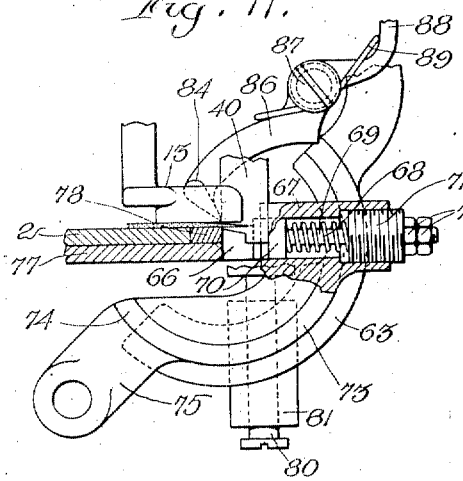
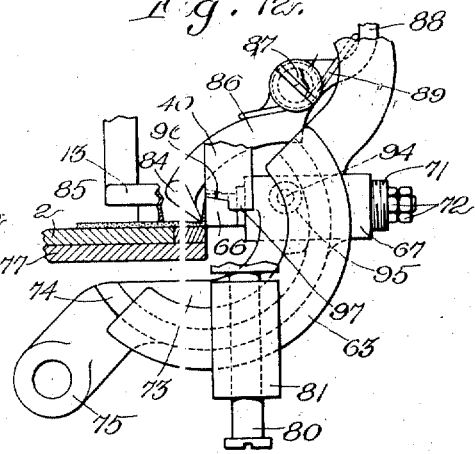
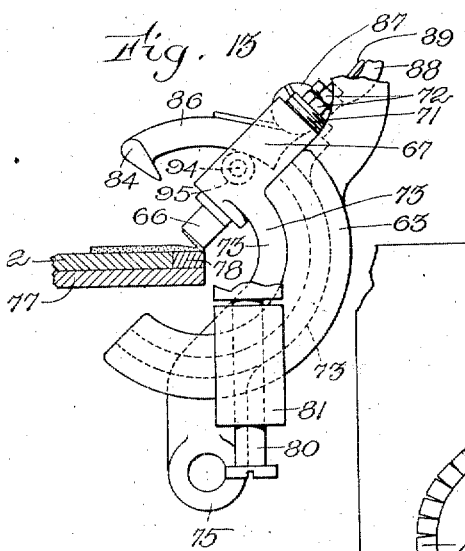
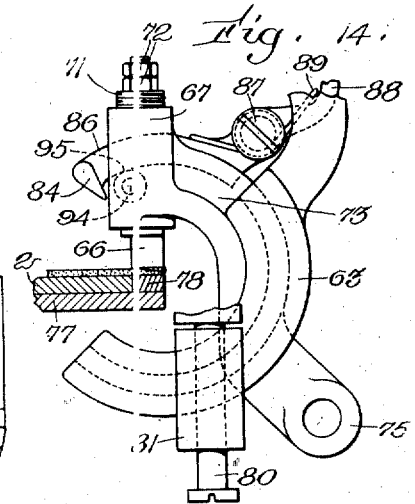
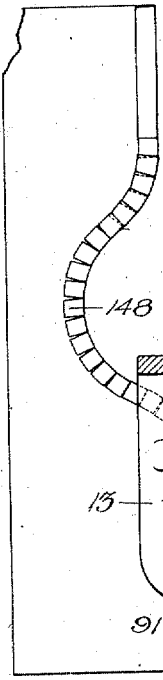

UNITED STATES PATENT OFFICE.

PERLEY R. GLASS, OF BOSTON, MASSACHUSETTS, ASSIGNOR TO P. R. GLASS COMPANY, OF BOSTON, MASSACHUSETTS, A CORPORATION OF MASSACHUSETTS.

FOLDING-MACHINE.

1,224,529.  Specification of Letters Patent.  Patented May 1, 1917.

Application filed January 13, 1910. Serial No. 537,947.

*To all whom it may concern:*

Be it known that I, PERLEY R. GLASS, of Boston, in the county of Suffolk and State of Massachusetts, have invented certain new and useful Improvements in Folding-Machines, of which the following is a specification.

This invention relates to machines for folding or doubling over the edges of sheet material such as pieces of leather used in the manufacture of boot and shoe uppers. Such pieces usually are folded at those edges which are exposed in the finished shoe, the folding being done to prevent exposing of a raw edge of leather at a seam on the exterior of the shoe. Previous to the folding operation, the edge upon which the fold is to be formed is usually skived to a thin edge on a bevel which extends over approximately double the width of the folded strip, so that the thickness at the fold when the doubling operation is complete is practically the same as the thickness of the whole sheet of stock.

My object in devising the present invention was to produce a machine by which the edge of a sheet of leather or other material of any extent may be doubled over a little at a time, and to enable the fold to lie smoothly at curved parts of such edge. The latter object is accomplished by providing a snipping cutter to make incisions or slits normal to the edge of the stock at the points where the latter is curved, so that separate tongues are thereby formed which may be laid over smoothly without stretching where the curvature is concave, or puckering where it is convex. Another object has been to provide means for throwing the snipping cutter into and out of action when desired, for it is only in acting upon curved edges that the stock need be slitted. Another object is to enable the rate of feed of the stock with relation to the folding or turning devices to be varied, so that when straight edges are acted upon, time may be saved in the folding operation, and when the edges are curved the slits made at these points by the snipping cutter may be located sufficiently close together to make a smooth and unpuckered fold. Finally, an object subsidiary to the foregoing has been to provide a generally novel and improved machine for the purpose, having folding instrumentalities constructed to act progressively upon limited contiguous lengths of the edge to be folded, and to obtain the final result in a better and more efficient manner than has hitherto been possible.

In the accompanying drawings I have illustrated a machine which I have invented to carry the above objects into effect, the said machine embodying the principles which at present are preferred by me, it being understood, however, that the means and instrumentalities shown are merely illustrative of one mode in which the invention may be carried into effect, and are not exhaustive.

In the drawings Figure 1 represents a front elevation of the machine hereinbefore referred to, the base portion thereof being in section.

Figs. 11, 12, 13 and 14 are views showing in elevation the folding instrumentalities in different positions.

Fig. 15 is a plan view showing the character of work produced by this machine and the relation of the work to the presser, snipping cutter and folder.

The same reference characters indicate the same parts in all the figures.

Figure 1:
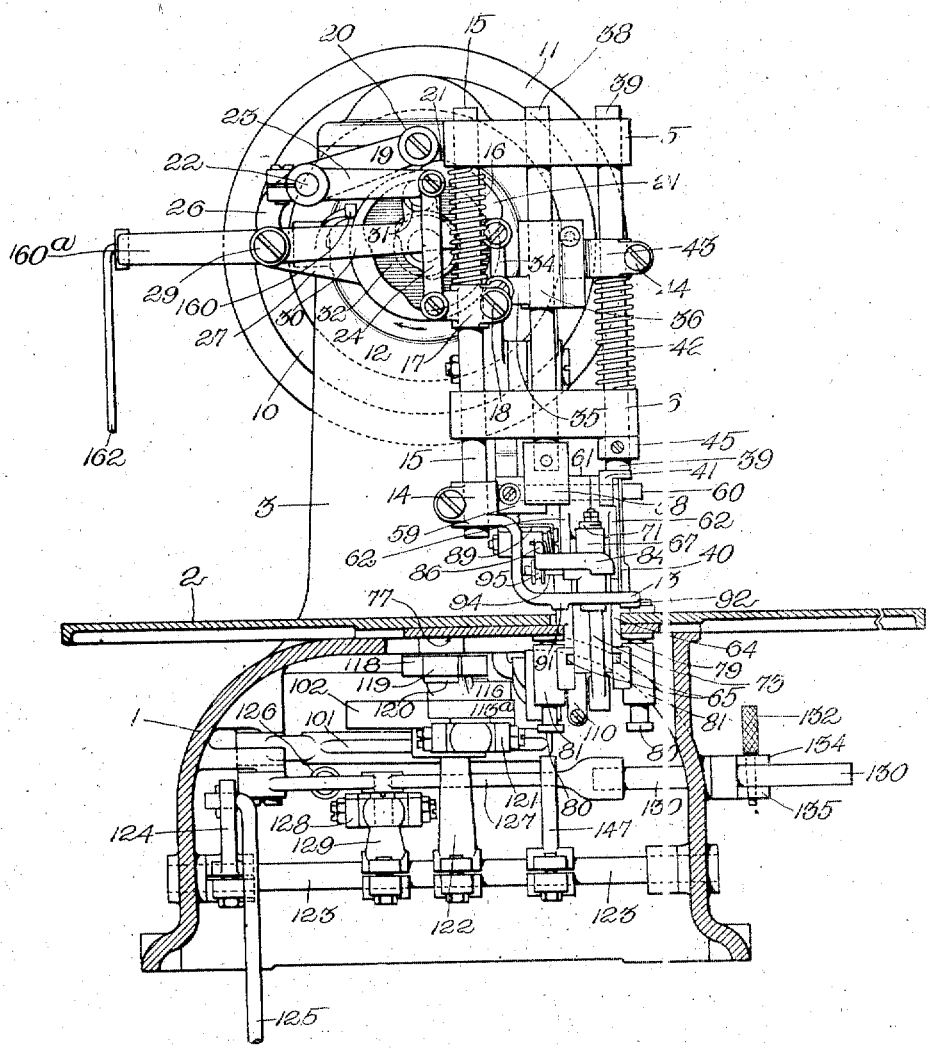

Referring to the drawings the machine is shown as comprising a base 1, having a work table 2, here represented as being circular in form. At the rear of the base rises the column 3, from which projects a horizontal arm 4 extending over the table. The arm 4 carries at its end separated guide members 5, 6, in which are formed alining holes or passages to receive and guide the reciprocating bars which are a feature of this machine, and are hereinafter fully described.

In bearings 7 and 8 formed at the front and rear ends of the arm 4 is rotatively contained a main drive shaft 9 having on its outer or rear end means by which it may be rotated, such as the belt pulleys 10 and hand wheel 11. On the forward end of the shaft 9 is a cam disk 12, by which the presser, folder and snipper are reciprocated.

The pressing device by which the work is held upon the table while the folding means and the snipping cutter (when operating) act is shown as a foot or clamp 13 connected by a curved arm with a split clamping sleeve 14 upon a presser bar 15, which reciprocates vertically in the guides 5 and 6. This bar and presser foot are normally pressed against the table by a spring 16 engaged with the under side of the guide 5 and pressing downwardly upon an adjustable split collar 17, which is clamped by means of a screw 18 in any desired position upon the bar. The latter is raised against the tension of the spring by an arm 19 carrying a roll 20, which rests against the periphery of the cam disk 12 and is raised whenever a protuberance 21 on the disk engages it. This arm 19 is secured to a rock shaft 22, the latter carrying a second arm 23 and is connected with the collar 17 by a link 24. The manner in which these elements act is obvious. The rock shaft 22 is held in a bearing 25 (Figs. 1 and 2) formed upon an arm 26, which rises from a bracket 27 projecting laterally from the forward end of the arm 4.

At the junction of the arm 26 with the bracket 27 is a bearing sleeve 28, in which is contained a pivot stud 29, whereon is fulcrumed a lever 30 which extends across the face of the cam disk 12 and carries a roll 31 projecting into a groove 32 in the face of the disk. This roll is mounted upon a stud which is secured in a short upwardly projecting lug of the lever 30. The outer end of the lever is connected by a link 34 to an ear 35 projecting from a collar or sleeve 36, mounted upon and secured to the bar 38 beside the presser bar 15, and, like the latter, reciprocable vertically in the guides 5 and 6. This bar 38 supports and assists in operating the folder or turning device hereinafter described.

Parallel to the bars 15 and 38 is a third bar 39, also reciprocable in the guides 5 and 6 and carrying a snipping knife 40. This knife projects downward from a holder 41 secured to the lower end of the bar 39, and is normally held by a spring 42 so that its lower end on which the cutting edge is formed is above the surface of the table 2. The spring 42 rests on the guide 6 and acts upwardly against the collar 43 clamped upon the bar 39 by a screw 44. A collar 45 adjustably secured upon the bar 39 limits the extent to which the spring may raise this bar and the associated snipping knife 40.

Figure 8:
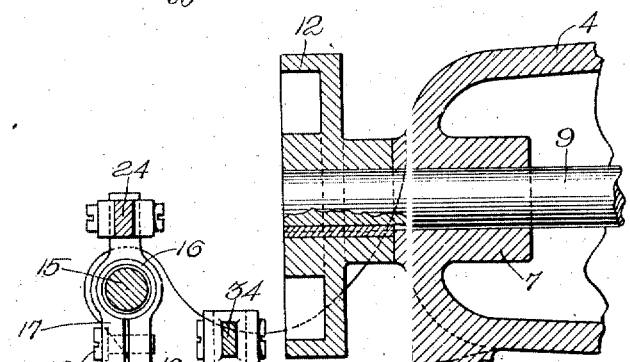
Fig. 8 is a horizontal section on line 8—8 of Fig. 3.
Figure 9:
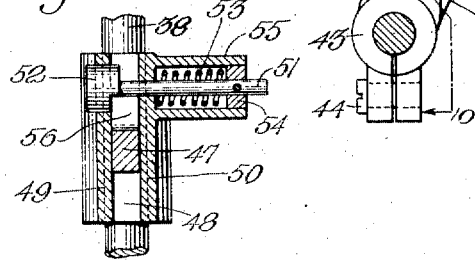
Fig. 9 is a section on the line 9—9 of Fig. 8.
Figure 10:
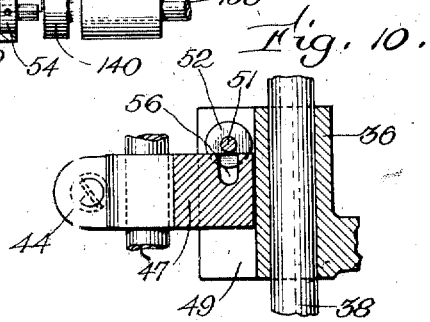
Fig. 10 represents a section taken on line, 10—10 of Fig. 8.

The knife bar and knife are reciprocated by the sleeve or head 36 when the knife is put into operation, and a detachable engagement between the bar and sleeve is provided to permit the knife to be rendered inoperative when the folding is carried on without snipping. The collar 43 has a wing 47 (see Figs. 8, 9 and 10) which extends into a slot or guideway 48 between wings 49 and 50, which project from one side of the sleeve 36. A pin 51 is supported by the wings 49 and 50 and crosses the slot 48. A head 52 is formed on the pin or rod 51 and is contained in a perforation in the wing 49, being somewhat longer than the thickness of said wing, so that it may have a limited movement into and out of the slot 48. It is normally held in the position shown in Figs. 8 and 9, wherein it partially crosses the slots 48 and overlies the wing or arm 47, being held in this position by a spring 53 bearing against a collar 54 secured upon the pin 51. The spring and collar are inclosed in a sleeve 55 formed integrally with and projecting laterally from the wing 50. When the head 52 is in the position shown in Figs. 8 and 9 it bears against the extension 47 of the collar 43 and causes the latter to be depressed whenever the lever 30 and sleeve 36 are moved downward. When the latter elements rise the collar 43, and with it the bar 39 and snipper 40, are raised. Thus the snipping knife is reciprocated through the alternating action of the head 52 and spring 42. When the rod 51 is pushed outward sufficiently far to carry the inner end of the head 52 up to the wall of the slot 48, the wing or arm 47 is no longer engaged by the head, and the rod 51 is enabled to enter a recess 56 in the arm 47. When in this position reciprocation of the sleeve 36 has no effect upon the bar 39, but the latter and the snipping knife remain stationary. The means for thus moving the rod 51 and the head 52 so as to disable the snipping knife is hereinafter described.

Figure 5:
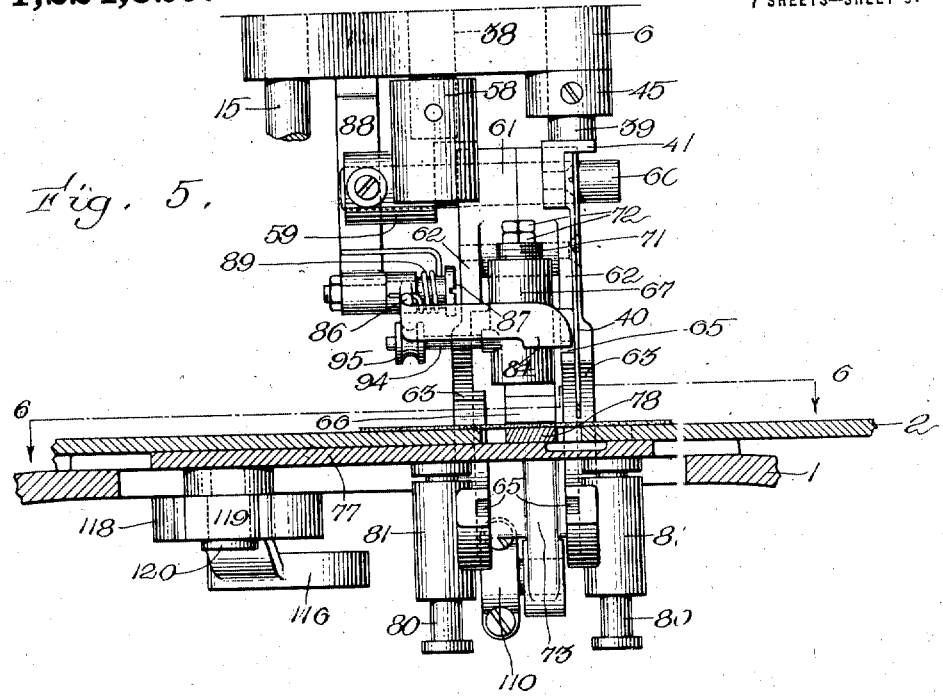
Fig. 5 is a front elevation of the folding devices shown in detail on an enlarged scale.

I will now proceed to describe the folding or turning devices and the means for operating the same. On the lower end of the reciprocating bar 38 is a head 58 on the rear part of which is formed a socket 59. This socket carries a pin 60 which forms a bearing for the folder, by which the latter is supported and on which it may move laterally. The part of the folder which is directly engaged with the pin 60 is a hub 61 from which two arms 62 depend, the hub preferably being made in two parts secured together and one of the arms being formed on each of these parts. These arms are parallel to each other, as shown in Fig. 5, and each carries a circularly curved guide 63, passing through an opening 64 in the table 2. In the inner or adjacent faces of the guides 63 are grooves 65 shown best in Figs. 5 and 6, and indicated also by dotted lines in Figs. 3, 11, 12, 13 and 14. These guides support a folding device which oscillates about the center of curvature of the grooves and is illustrated in detail in Figs. 11 to 14. The folding device or member which directly engages with the material to be folded is a block 66 on the end of a plunger which enters a sleeve 67 and is projected by a spring 68 contained in said sleeve. The spring surrounds a shank 69 on the plunger 70, from which the block 66 projects and reacts against a thimble 71 threaded into the end of the sleeve. Adjusting and locking nuts 72 on the end of the shank 69 outside of the thimble govern the amount by which the folding block 66 may be projected by the spring. This sleeve 67 is formed directly upon a curved arm 73 having circularly curved ribs 74 on opposite sides thereof, which are contained in the curved grooves 65 of the guide members 63. A perforated lug 75 is formed on the curved arm 73 and is moved back and fourth to oscillate the folder or edge-turner by mechanism presently to be described. As will presently be explained, one function of the block 66 is to press the fold, and consequently this block with the plunger 70 and its shank 69, all of which are rigidly connected, may be termed a fold presser. It has been explained above that the fold presser may be adjusted in its sleeve or housing 67 by manipulating the adjusting and locking nuts 72. It should be noted, however, that manipulation of these nuts serves also to vary the tension of the spring 68 and that adjustment of the fold presser in its housing without varying said tension may be accomplished by turning the threaded sleeve 71.

Operating in conjunction with the folder is a slide 77 beneath the table which carries a block 78 contained in the forward part of the opening 64 previously referred to, and which is flush with the surface of the table. This block is directly opposite to the folding member 66 and supports the edge of the sheet material up to the line of folding. It also coöperates with the folder, after the edge is doubled over to sustain the pressure of the folder and thus forms a complemental fold-pressing member. While the folded stock is gripped between the edge turner or folder 66 and the block 78 the slide 77 is given a lateral movement to feed the stock and thus the folder and block constitute complemental grippers by which a step-by-step feed is given to the stock. The slide 77 also has an aperture 79 beneath the opening 64 of the table, through which the guide members 63 of the folder extend. These guide members are connected with the slide so as to be moved laterally with the feeding movement thereof, and at the same time to have provision for an up and down movement, which, in the present embodiment of the invention, is necessary to carry out the folding operation. The means for connecting the folder guides to the slide consist of posts or bearing rods 80 projecting downward from the slide on each side of the opening 79 and sleeves 81 embracing said posts and connected each with one of the curved guide members 63. When the slide is moved laterally the posts 81 carry the folder guides and folder with it, the hub portion 61 of the folder guides then moving laterally along the supporting rod or pin 60. When the bar 38, by which the folder is supported as previously described, is reciprocated, the sleeves 81 slide up and down on the posts 80. The slide 77 is preferably a rectangular plate of which the outline is shown in dotted lines in Fig. 6, and is supported by ways 82 formed in the top of the base 1 underlying those edges of the slide which extend in the direction of its motion.

Figure 7:
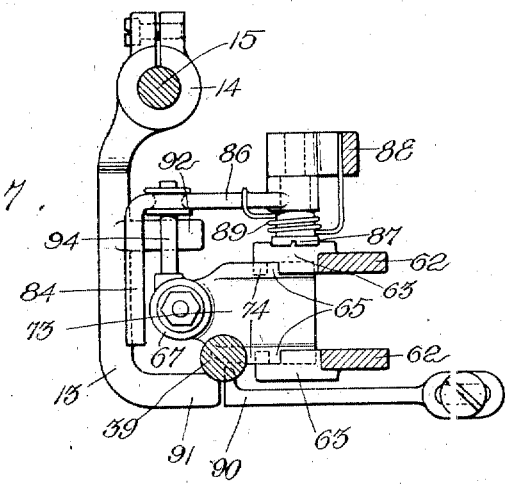
Fig. 7 is a sectional plan view on line 7—7 of Fig. 3.

Coöperating with the folder to locate the line of the fold or crease accurately is a member 84 which for convenience of description may be termed a crease or fold guide. This member as shown best in Figs. 11, 12, 13 and 14, is located above the block 78 and near the edge thereof adjacent to the folder 66, and bears against the upper side of the stock (which is represented by 85) on the line about which the edge is to be folded. This fold guide extends in the direction of feed of the stock, being shown in plan view in Fig. 7, and is secured to the end of an arm 86, which is pivoted to a stud 87. The latter is carried by a bracket 88, which depends from the under side of the lower guide 6. A spring 89 is coiled around the stud 87 and bears against the bracket 88 and arm 86, tending to hold the fold guide with a yielding pressure against the stock.

Figure 6:
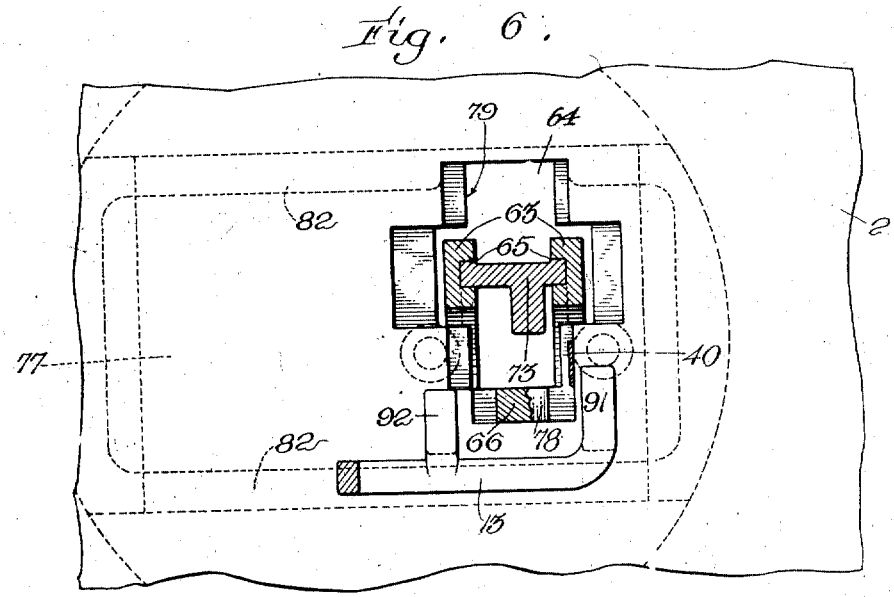
Fig. 6 is a plan view of part of the work table, the folding mechanism being shown in section on the line 6—6 of Fig. 5.

From the foregoing description the mode of operation of the folding instrumentalities will be readily understood. The stock being laid upon the table is pushed across the opening 64 therein until its edge encounters a gage 90 (shown best in Fig. 7,) which is secured to the table and is provided with a slot to permit of a limited back and forth adjustment. The presser foot having been elevated when the stock is inserted, is caused to descend through the action of the spring 16 when released by the cam 21 and intermediate connections previously described, and grips the stock, being provided with two projections 91 and 92 on opposite sides of that portion of the opening in the table which receives the block 78, as shown in Fig. 6. The edge of the stock when in contact with the gage 90 projects beyond the edge of the block 78 above the turning or folding device 66, and the crease guide or crease 84 bears against the upper surface of the stock. As the end of the folder 66 abuts against the block 78, the edge of the crease guide is practically coincident with the meeting line between the folder and block. The parts are then in the position shown in Fig. 11, with the folder horizontal and its upper side flush with the surface of the block and table. It should be noted that the folder 66 is rectangular and preferably of the same dimensions as the block 78, as shown in Fig. 6, where the folder 66 is shown in section partly broken away and one end of the block 78 is shown in plan. In this position the folder-carrying bar 38 is depressed to its lowest limit. The folder bar 38 is then raised, carrying the folder into the position shown in Fig. 12. The end of the folder in rising turns the edge of the stock upward about the crease guide 84, the spring 89 of the latter being sufficiently strong to hold the stock down on the support. At the end of the upward travel of the folder the lower edge thereof is at the same level with and close to the nearest edge of the block 78 and, as this line coincides with the center of curvature of the guide members 63, the folder when moved in the guide members is caused to turn about this line, (which is also the line of fold) as an axis, and so fold over the upturned edge, as shown in Figs. 13 and 14. The crease guide is moved out of the way of the folder by a stud 94 which projects from the side of the folder socket 67 and carries a wheel 95 in position to strike the arm 86 of the crease guide and throw the latter forwardly and upwardly out of the way. The spring 68, acting upon the folder, enables the latter to yield when pressing upon the folded edge, as shown in Fig. 14, thus accommodating the irregularities in the thickness of the leather or other material, and holding the same upon the block with a firm yielding pressure.

While the folder remains in the position shown in Fig. 14, the cam 21 causes the presser foot to rise, and at this instant the slide 77 is given a lateral movement, carrying with it the block 78 and folder 66, which together feed the stock a step to the left. Then the folder is caused to release the stock and the slide is returned to its previous position, carrying with it the folder. When this return occurs the presser foot is in action upon the stock, preventing it from being carried back.

When the snipping knife 40 is in operation, it is caused to descend whenever the folder is lowered into the position shown in Fig. 11. It is located at one side of the folder and coöperating block 78, as shown in Figs. 1, 6 and 15, and is close beside one of the edges of the aperture 64 in the table. The cutting edge of the knife is at the lower end thereof, and extends through only a part of the width of the knife, as shown in Figs. 11 and 12, where 96 represents the cutting edge. Below the cutting edge and at the extreme end of the knife is an extension 97 which bears against the edge of the table when the knife is in action and resists any tendency which the stock might have to deflect the knife, owing to the bevel of its sharpened edge. The knife is located so as to pass by the block 78 in close proximity thereto, and the length of its cutting edge is as great or greater than the amount by which the edge of the stock projects beyond the supporting block 78, whereby the stock is snipped or slitted up to the line of fold, but no farther.

The mechanism by which the folder is operated to turn over the edge of the stock and by which the feeding is effected will now be described. 98 represents a vertical shaft which is driven from the main shaft 9 through bevel gears 99 and 100. On the shaft are two cams 101 and 102, of which the former is contained within a frame member 103, pivoted to a stud 104, within the base of the machine. This frame is in effect a slotted lever of slight length as compared with the width of the slot. The end of the frame or slotted lever 103 is pivoted to a link 105, of which the forward end is connected with the arm 75 previously described on the folding device holder. As the frame lever 103 and the arm 75 oscillate in different planes, the former swinging in a generally horizontal and the latter in a vertical plane, the link 105 is connected with them by ball and socket joints, in order to permit displacement of the opposite ends of the link in different planes. The joints are formed respectively by a pin 107 on the lever 103, which pin has a spherical head contained in a correspondingly recessed box 108 on the link, while on the arm 75 is a pin 109 having a spherically formed head or enlargement contained in a box 110 on the forward end of the link.

The cam 102 has a groove 111 in its upper face, which receives a roll 112 carried by one arm of the lever 113, which is pivoted at 114 to a stud within the base of the machine. The other arm 113ᵃ of the lever 113 is slotted and contains a pin 115, which is movable along the slot. This pin projects also into a similar slot in one arm of the complemental lever 116, which is pivoted upon a stud 117. The arm of the lever 116 on the opposite side of the fulcrum from the slotted arm is provided with jaws 118, which embrace a block 119, pivoted upon a stud 120 which projects downward from the slide 77. As the lever 113 is oscillated by the cam 102, the slide 77 is correspondingly moved back and forth, the block 119 sliding in the space between the jaws 118. At each movement of the jaws toward the left of the machine, the stock is fed one step, owing to its being clamped between the supporting block 78 and folder 66, and upon the return of the jaws to the right, the slide block and folder are returned in position to engage a fresh portion of the stock.

One of the objects of my invention is to enable the length of the feed to be varied while the machine is in operation, and this is accomplished by making the throw of the lever 116 variable. For this purpose the stud 115 is moved in the slotted arms of the levers 113 and 116 between the pivots 114 and 117 of the respective levers. When the pin is nearest to the fulcrum 114 the amount of travel of the slide 77 and consequently the feed is of the minimum extent, while when the pin is at the other limit of the slots, and nearest to the fulcrum 117, the feed is the maximum in amount. Intermediate positions of the pin cause correspondingly increased or diminished amounts of feed.

In order to shift the pin 115, the latter is connected to a link 121, which is also connected to an arm 122 rising from a rock shaft 123. A third arm 124 on the rock shaft has connected to it a link 125 leading to a treadle. As the machine is intended to be mounted upon a bench or standard, the treadle is at some distance below it in such a position as to be accessible to the foot of the operator, and as the treadle may be of any form or type and as its exact form is not a feature of this invention, it is not illustrated herein. When the treadle is so operated as to draw the link 125 downward, the pin 115 is moved toward the fulcrum 117 and the feed is increased. When the pressure on the treadle is relieved, the pin is returned into the short feed position by a spring 126 acting upon a lever 127, which is connected with the rock shaft 123 by a link 128 connected to the lever 127 and to an arm 129 on the rock shaft. The tendency of the spring is to make the feed of the minimum amount whenever the treadle is not operated. An arm 130 extends from the lever 127 through a slot 131 in the side of the base to the outside of the machine, and serves as a means by which the feed may be varied manually, and also as a stop for governing the shorter limit of the feed. For the purpose of carrying out the latter function, arm 130 coöperates with stop 132, which is preferably a pin held in any one of a series of holes 133 in segmental plates 134 and 135 respectively above and below the slot 131, the pin when in any of the holes being extended across the slot. When the outline of the edge to be folded is curved the stop pin 132 is set so that the cuts made by the snipping knife, the distances apart of which are governed by the amount of the feed, are near enough together to permit the folded edge to lie smoothly, these distances varying in accordance with the sharpness of the curvature. When an outline of more gradual curvature or a straight edge is presented to the folding and snipping devices, the feed is increased by operation of the treadle to the maximum amount, in order to economize time in performing the work. Thus while the machine is in continuous operation, and without interrupting the work at all, the cuts and lengths doubled over at each folding operation may be made close enough together and narrow enough respectively to produce a smooth folded edge, while upon straight portions or parts of more gradual curvature the feeding speed may be increased. Thus in one machine are combined capability of producing perfect work with means for saving time in operation.

As snipping of the edge to be folded is only necessary at curved portions of the edge to prevent stretching and tearing or puckering, I find it advisable to provide means for throwing the knife out of operation when its use is not needed, as when straight edges of stock are acted on. This is done in the interest mainly of economy of time, as it saves wear on the cutting edge of the knife and causes less frequent stoppage of the machine for resharpening the knife. It also, by eliminating one of the reciprocating parts, diminishes the vibration and increases the life of the machine as a whole. Disconnection of the snipping cutter so that it remains inoperative is effected by disengagement of the head 52 previously described from the wing or arm 47 of the knife-carrier previously described, through mechanism controlled by the treadle which regulates the feed. This mechanism consists of a rod 138 mounted beside the upper arm 4 of the machine, and supported at one end by a bracket 139. The end of the rod carries a flat head or disk 140 arranged close beside the end of the pin 51 previously described. The vertical extent of this disk or head is at least as great as the travel of the knife, so that it always overlaps somewhat the end of the pin 51, and thus, whenever it may be reciprocated forwardly, it bears on the pin and moves the head 52 thereon out of engagement with the arm or wing 47, leaving the knife bar 39 disengaged from its actuator, whereby the knife is disabled and caused to remain stationary while the other mechanisms operate. The rear end of the rod 138 is connected with a bell crank lever 141 having a generally horizontal arm which is engaged with a pin 142 carried by a rod 143, the lower end of which is pivoted to a lever 144 pivoted at 145 upon a stud projecting downward from the top wall of the base of the machine. This lever 144 has a bearing edge or surface 146 beneath which is an arm 147 connected to the rock shaft 123 previously described. When the treadle is operated and the shaft rocked so as to lengthen the feed, the arm 147 is swung forward and its upper end bears against the surface 146. This occurs when the pin 115 is near its forward limit, and thus the extreme movement of the treadle, after increasing the feed, causes the lever 144 to be raised and the snipping knife to be thrown out of operation through the connections last described acting upon the rod 138.

The effect of snipping the edge of the stock and throwing the snipper out of operation is shown in Fig. 15. In this figure a piece of stock is shown having a reversely curved edge and the upper portion of which is straight. The cuts made by the snipping knife divide the edge to be folded into a number of tongues 148, which when folded over spread apart at the concave portions of the outline and overlap each other where the curvature of the edge is convex. Where the edge is straight no slits are made, but the portion which is folded back is continuous. Although the entire straight portion is not folded over at once, but a little at a time, the fold guide 84 preserves the line of fold, making it straight and continuous.

As the feed of the stock is entirely automatic, being controlled only as to the length of steps thereof by the operator, the duties of the latter are reduced to swinging the stock back and forth so as to keep that portion of the edge which is acted upon perpendicular to the snipping knife and tangent to the folder so that the tongues are properly formed and turned and the line of fold is maintained parallel to and at a uniform distance from the original edge of the stock.

Figure 4:
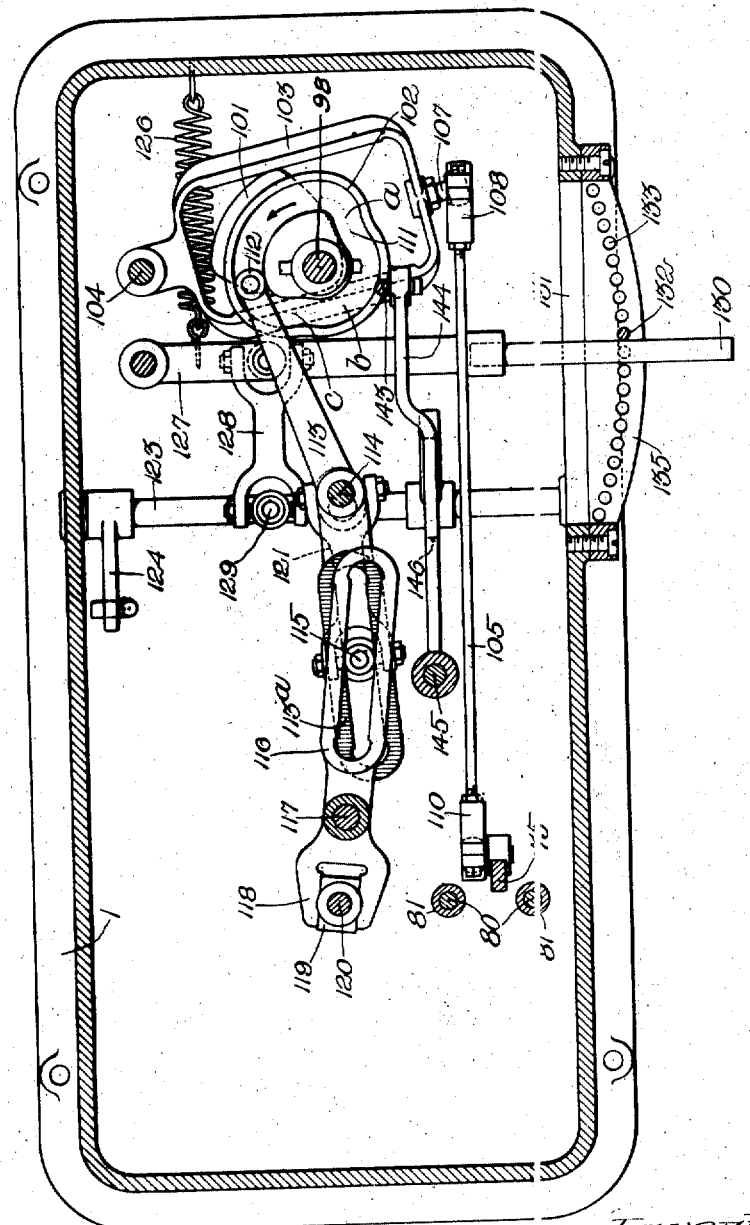
Fig. 4 is a horizontal section on line 4—4 of Fig. 3.

From a comparison with Figs. 1 and 4, the timing of the cams and the order of operations of the machine will be determined. It being assumed that the cams are rotating in the direction of the arrows shown in these figures, it will be seen that the presser foot is represented as just returning to grip the stock after it has been fed. The step about to be performed with the parts in the positions illustrated is the return of the folder into the position shown in Fig. 12 through the action of the cam 101 on the rod 105. By the time the folder has been swung back clear of the supporting block, the inwardly offset part of the cam groove 32 in the disk 12 has arrived in position to act on the stud 31 and to depress the folder. Immediately thereafter and while the folder is depressed, the portion $a$ of cam 101 acts on the lever 113 to return the slide 77 and folder to starting position. When these parts have again come to rest, the lever 13 being held stationary by the dwell portion $b$ of cam 101, the folder is raised by the cam groove 32 and swung forward by the cam 101. As soon as this motion is complete the offset part $c$ of cam 101 swings the lever 113 and feeds the stock, the cam projection 21 then being in position to raise the presser foot. At the time when the feeding members are returned to starting position, the snipping knife as well as the folder is depressed and the knife intersects the edge of the stock, but as the stock is held stationary by the presser foot, the knife does not interfere in any way with the operations of the machine or injure the stock.

It is desirable at times to raise the presser foot independently of the automatic mechanism provided for that purpose, and for this a lever 160 is provided. This lever is pivoted upon a stud 161 on the arm 4, and has one of its arms projecting under the lever 19. The other arm 160$^a$ is connected through a link 162 with a treadle (not shown).

Owing to the manner in which the folding device 66 is supported and operated, being carried in a holder or guide 63, in which or by which it is caused to move rotarily, and being also movable bodily with said guide or holder, it is caused to act on the edge of the stock first with a wiping action to bend up the edge of the stock, and then with a turning action to carry the bent up edge back upon the body of the stock. The wiping movement in which the folder travels bodily enables approximately the first half of the turning operation to be performed quickly and with a slight movement of the folder, the stock being held and the position of the fold located by the crease or fold guide 84. Then the remainder of the folding operation is performed by the rotary movement of the folder about an axis approximately coincident with the folding line, which enables this line to be maintained even after the guide 84 is removed, and permits removal of said guide at a comparatively early point and before it is embraced by the folded stock. Thus the rotary movement of the folder is limited to an arc of about 90°, whereby such movement may be produced by a simple crank and link motion, as here illustrated, while the character of the last part of the fold, being a simple revoluble movement about the line of the fold, enables the preliminary guide 84 to be removed without danger or liability of displacing the stock and destroying the continuity of the fold.

The snipping device is located so close beside the folder that the tongue which is formed by each cut of the knife is immediately thereafter engaged and turned up by the folder. That is, in the folding operation the folder is practically against the knife and governs the width of the tongues formed by the cuts of the knife by the distance which it travels during its feeding movement from the latter. Thus, as soon as a tongue is formed by the cutting action of the knife, it is folded over, each tongue being folded as soon as severed from the edge of the stock, and there being no tongues between the folding device and the cutter. Owing to this arrangement it is possible to form a fold upon an edge of any curvature, however sharp, because the stock may be turned at any angle necessary to bring the cut perpendicular or normal to the edge of the stock, without displacing the tongue from the folder. Provided the stock is so held that its outline or edge comes perpendicular to the line of cut formed by the knife, it is correctly positioned with regard to both the knife and the folder, so that the tongue made by the knife is properly located to be turned about the perpendicular line of fold. This is one of the most important features of the invention in that it fits the machine for operation of all characters of work, whatever may be the curvature of the edges to be folded, and thus makes a machine of universal application within the limits of this particular type of work, and avoids the necessity of substitution of new dies, or even of making any adjustment of the machine when work having outlines of various forms or degrees of curvature is acted upon.

Figure 2:
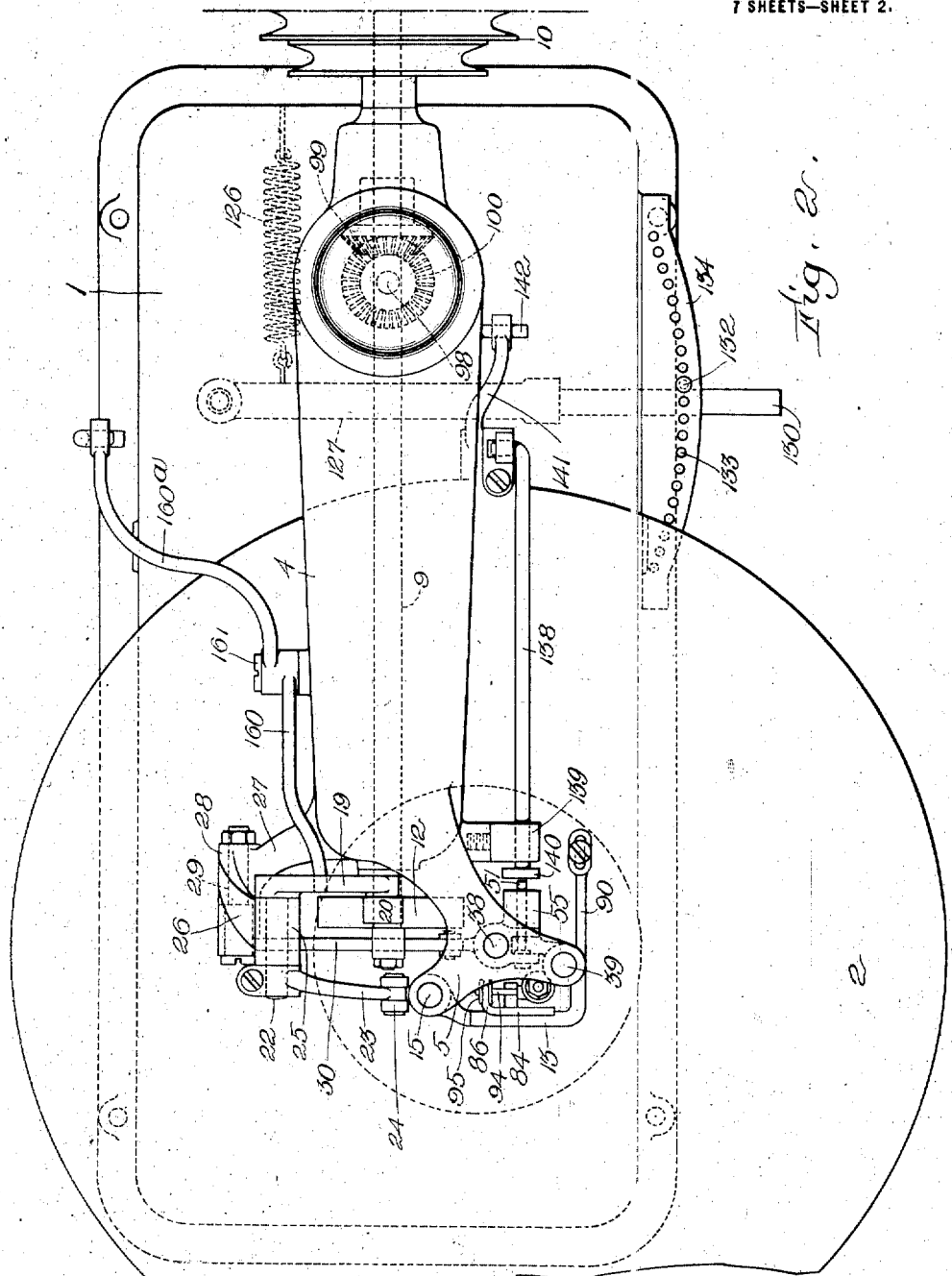
Fig. 2 is a plan view of the machine.
Figure 3:
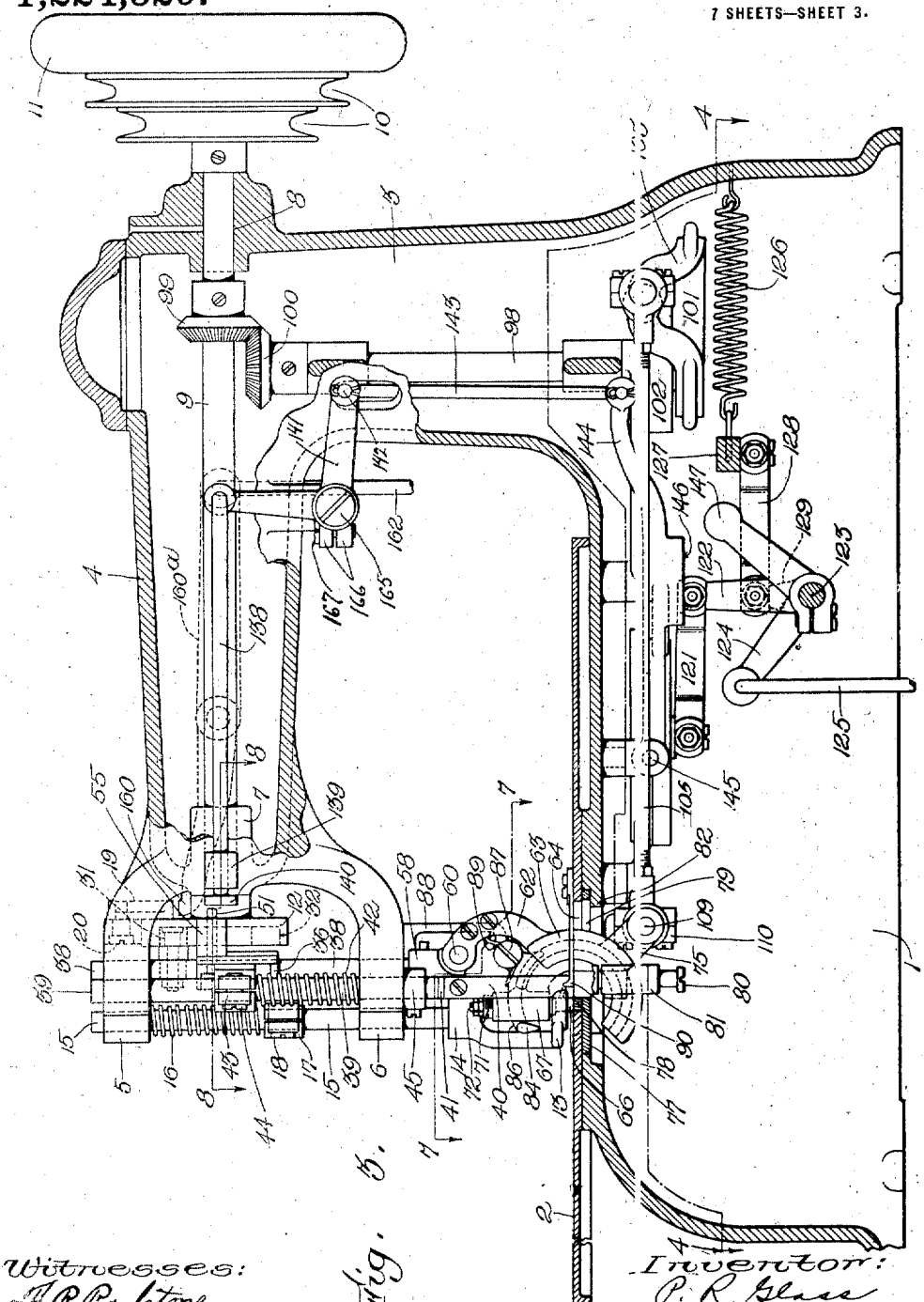
Fig. 3 is a longitudinal vertical section of the machine, the folding devices being shown in elevation.

Mention has previously been made of the capability which is a feature of this machine of enabling the cutter to be thrown out of operation when work having straight or gradually curved edges is acted upon. It is possible to so adjust the connections for disabling the knife that either the knife may be retained in operation at all times, even with the maximum feed, or it may be kept out of operation, even when the feed is shortened and the treadle or other device for governing the feed is left out of operation. For this purpose a certain amount of play is left between the pin 51 and guide 139, as shown in Figs. 2 and 3, whereby the disk or head 40 on the rod 138 may be moved back at so great a distance from the pin 51 as to prevent engagement therewith. The bell crank lever 141 is made in two parts, one part or arm of which turns freely upon the stud or pivot 165 whereon it has its bearing, and the other arm of which is provided with a split hub surrounding a hub or thimble of the arm 141. Ears 166 are formed on the hub and are adapted to be drawn together by a screw or the like 167, whereby the upright arm of the bell crank lever 141 may be held at any angle to the horizontal arm hereof. By adjusting the upright arm in one direction the disk 140 may be maintained in permanent engagement with the pin 51, thereby holding the knife-operating mechanism disabled at all times, and by shifting it in the opposite direction the disk 140 may be moved so far away from the pin 51 as not to be brought into engagement with the latter at any time.

The word rotarily, where used in the foregoing description, and in the following claims, is intended to mean that the movement so qualified is movement occurring in a curved path about a center or axis.

I claim:—

1. A folding machine comprising a turning device, means for causing said turning device to press upon and release the stock, mechanism for moving the turning device back and forth while respectively pressing upon and clear of the stock to feed the stock in a series of steps, and mechanism for varying the rate of feed while the machine is in operation.

2. A machine for folding the edges of sheet stock, comprising a turning or folding device adapted to act on a short extent of stock, mechanism for causing a relative lateral movement between the stock and folding device to be effected whereby the latter is enabled to act successively upon contiguous portions of the stock, a snipping cutter arranged to act on the stock beside said turning device, and means for increasing the extent of such relative movement and simultaneously disabling said snipping cutter.

3. A folding machine adapted to double over the edge of sheet material and feed the same while under pressure, comprising a turning or folding device adapted to act on short lengths of the edge of such material, means for moving said folding device while gripping the material, a snipping cutter for making incisions in such edge, automatic mechanism for operating said cutter, and means under the control of the operator of the machine for making said operating mechanism inoperative.

4. A folding machine for folding the edge of sheet material, comprising a gripper, a folding device movable at right angles to stock placed on said gripper, and oscillatively about an axis substantially in the plane of the gripper, and means for so operating said folding device whereby a portion of the stock projecting from the gripper is bent over and doubled back upon the body of the stock.

5. A folding machine for folding the edge of sheet material, comprising a table to support the material, a folding device movable transversely through an aperture in said table and oscillatively about an axis substantially in the plane of the table, means for so operating said folding device whereby a portion of the stock projecting over such aperture is bent over and doubled back upon the body of the stock, a gripping member movable in the plane of the table and opposed to said folding device, arranged to coöperate with the latter and grip the folded stock, and means for moving said gripping device and folding device simultaneously to feed the stock.

6. A machine for folding the edge of sheet material, comprising a turning device movable to bend the edge of the stock back upon itself, a supporting member coöperating with said turning device to support the stock and grip the edge thereof when folded, and mechanism for moving said supporting device and turning device simultaneously in a direction transverse to the turning or folding movement of the latter to feed the stock.

7. A folding machine comprising a table for supporting the stock to be folded, said table having an aperture, a block movable in said aperture and having a surface flush with the supporting surface of said table, a folding device supported movably in said aperture in close proximity to said block, mechanism for moving said folding device about the edge of said block in a curved path to fold over a projecting edge of the stock, said folding device being arranged to clamp the stock upon said block when folded, and mechanism for moving said block and folding device simultaneously while gripping the stock to feed the latter.

8. A folding machine comprising a table for supporting the stock to be folded, said table having an aperture, a block movable in said aperture and having a surface flush with the supporting surface of said table, a folding device supported movably in said aperture in close proximity to said block, mechanism for moving said folding device about the edge of said block in a curved path to fold over a projecting edge of the stock, said folding device being arranged to clamp the stock upon said block when folded, mechanism for moving said block and folding device simultaneously while gripping the stock to feed the latter, and a presser foot holding the stock stationary upon the table while said block and folding device return to their starting position.

9. A machine for folding the edge of sheet material in a succession of operations, each acting upon a limited extent of such edge, comprising a folding device and a coöperating support and gripper, both being movable in unison, mechanism for moving said folding device relatively to said support in directions transverse to the edge of the stock so as to fold said edge back upon the stock and clamp the folded edge against the support, and mechanism for moving said folding device and support in their feeding direction, said mechanism being subsequently operative to return the folding device and support to their primary positions.

10. A machine for folding the edge of sheet material in a series of successive steps, comprising coöperating gripping members, one of which is movable relatively to the other in such manner as to double back the edge of the stock and grip the doubled or folded edge, and mechanism for moving said gripping members simultaneously in a direction transverse to that of their relative movement for feeding the stock, said mechanism being operative to return said members to their primary position, whereby they are enabled to act upon a fresh portion of the stock.

11. A folding machine adapted to fold the edges of sheet material, having curved or straight edges, comprising coöperating gripping members normally occupying a position in which the edge of the stock may extend across both members, means for moving and guiding one of said members in a direction such as to fold over the edge of the stock and grip it against the other members, mechanism for moving said members in unison in a direction transverse to that of their relative movement, whereby the stock is fed to present a fresh portion to the action of said members, said mechanism being subsequently operative to return the members to their primary position ready to engage such fresh portion, and a cutter arranged beside said members for snipping the edge of the stock when such edge is curved.

12. A folding machine adapted to fold the edges of sheet material having curved or straight edges, comprising coöperating gripping members normally occupying a position in which the edge of the stock may extend across both members, means for moving and guiding one of said members in a direction such as to fold over the edge of the stock and grip it against the other member, mechanism for moving said members in unison in a direction transverse to that of their relative movement, whereby the stock is fed to present a fresh portion to the actoin of said members, said mechanism being subsequently operative to return the members to their primary position ready to engage such fresh portion, means for changing the extent of such transverse motion to increase or diminish the rate of feed, a cutter arranged adjacent to said members and automatically operated to snip the edge of the stock during the return movement of said members, and means associated with said feed changing means and controlled by the operator of the machine for throwing said cutter out of operation when the rate of feed is increased to the maximum amount, whereby the snipping may be omitted when the edge to be folded is approximately straight.

13. A folding machine comprising a support for the stock having an aperture across which the edge of the stock to be folded may be placed, coöperating folding and gripping devices arranged in said aperture and movable in unison therein, said members being normally in such position that the stock may extend across both, mechanism for moving and guiding one of said members partially around the other, whereby the edge of the stock is doubled and gripped between said members, mechanism for moving said members to feed the stock, and a presser foot arranged to clamp the stock stationary upon the table while said members are returned to their primary position.

14. A folding machine for doubling the edge of sheet material in a series of steps, comprising a support for the stock, a fold guide arranged to bear on the stock at the line of the fold, a turning device movable from a position beside said support around the line of fold into a position opposed to said support, whereby the folded edge is pressed between it and the support, and means for producing a relative step by step lateral feed movement between the stock and said support and turning device for causing the turning device to act on successive portions of the stock, said guide serving to maintain the line of the fold after each step of the feed.

15. A folding machine comprising a support for the stock to be folded, a turning device normally located beside said support so that the edge of the stock projecting from the latter may extend over said turning device, a fold guide arranged to bear on the stock at the line of fold, mechanism for moving said turning device transversely to the plane of the support whereby the edge is bent up around said guide, and mechanism for swinging said turning device about an axis approximately coincident with the line of fold, whereby the folded edge is laid flat against the stock.

16. In a folding machine a support upon which the stock may be laid with the edge to be folded projecting beyond the support, a turning or folding device having a surface continuing from the supporting surface of said support over which the edge of the stock is laid, said folding device having a second surface beside the support and transverse to the supporting surface thereof, mechanism for moving said turning device bodily across the plane of the stock, whereby the edge of the same is turned up and brought into contact with the second named surface of said turning device, and means for rotating said turning device about an axis parallel to the plane of the stock, whereby the second surface of the turning device is carried over and against the support.

17. In a folding machine, a table having an aperture, a folding or turning device contained movably in said aperture and having its side approximately in the plane of the table and close to the forward edge of the aperture, so that the edge of the stock to be folded may extend across the side of the folding device, mechanism for translatively moving said folding device across the plane of the table, whereby the overlapping edge of the stock is bent up and brought against the end of the folding device, and means for rotating such folding device over the table until the end thereof is brought over and parallel to the surface of the table.

18. In a folding machine a support for the stock to be folded, a folder guide intersecting the plane of said support and movable transversely to said plane, a folder carried by said guide with its end portion normally in such relation to said support that the edge of the stock may extend thereover, mechanism for moving said guide and folder across the plane of the support, whereby the overlying edge of the stock is bent up and brought against the end of the folder, and mechanism for moving said folder in its guide, the latter being curved about an axis parallel to the plane of the support, whereby the folder is caused to swing around and over the support with the edge of the material between itself and the support.

19. Feed mechanism for a machine of the class described comprising a fold pressing member movable in a direction at right angles to the work for engaging said work, a lever for bodily moving said member to effect the feeding movement, a continuously actuated arm, a pivot connecting said lever and arm, and means for varying the amplitude of movement of said pivot and thereby the rate of feed.

20. A folding machine comprising a support and a turning device arranged side by side so that a sheet of stock may be laid over both, and mechanism for giving said turning device, first, a translative movement across the plane of the stock, whereby the latter is turned up approximately at right angles, and finally a rotative movement through an arc of approximately ninety degrees, whereby the upturned edge of the stock is doubled back.

21. In a folding machine a support for the stock to be folded, a guide extending over said support and having an edge adapted to bear upon the stock for locating the fold, an arm by which said guide is carried, yielding means acting upon said arm tending to hold the guide against the stock, a folding device movable in a curvilinear path about the edge of said guide to a position in which it bears against said support, and a projection carried by said folding device arranged to bear on said arm when the folding device approaches the support for displacing the guide from between the support and folding device.

22. In a folding machine a supporting member for the stock movable in the plane of its supporting surface, a holder or guide for a folding device crossing the plane of said support, a sliding connection by which said holder is engaged with said support, whereby it may slide transversely of the plane of the support, but is compelled to move with the latter, an actuator for said holder movable transverse to the plane of the support and with which said holder has a connection permitting movement relatively thereto of the holder in the directions of movement of the support, and a folding device carried by said holder and movable relatively thereto in directions transverse to the movements of both the holder and support.

23. In a folding machine a support for the stock, said support being movable in the plane of its supporting surface, a guide or holder for a folding device, a reciprocating carrier for said holder movable transversely to the plane of said support, sliding connections between said holder, its carrier and support, whereby the holder is compelled to move with both, and a folding device carried by said holder and movable thereon in a curved path about an axis parallel to the direction of movement of the support.

24. In a folding machine mechanism for both folding and feeding the stock, comprising a pair of coöperating gripping members, a guide or holder for one of said members whereby the latter is constrained to move from a position in which it underlies the edge of the stock to a position over the other member, wherein it coöperates with the latter to grip the stock, a slide to which one of said grippers and the holder of the other gripper are both connected, and mechanism for moving said slide, said mechanism being timed to operate when the stock is grasped by said gripping members, whereby the feed is accomplished.

25. In a folding machine a support, a folding device located close to the edge of said support whereby the material placed on the latter may project over the folder, a curved guide by which said folder is carried, mechanism for moving said guide and with it the folder into a position wherein its center of curvature is approximately coincident with the supporting surface of said support, and means for moving said folder upon said guide, whereby the folder is rotarily moved about the edge of the support.

26. A folding mechanism comprising a support for stock, a folder located adjacent to the edge of said support so that the edge of the material placed on the latter may extend over the folder, mechanism for moving said folder first transversely to the plane of the support, whereby the edge of the stock is turned with a wiping action, and means for subsequently rotating the folder around the edge of the support and toward the plane of the latter, whereby the edge of the stock is folded back.

27. In a folding machine a support for the stock, a folding device, a guide upon which said folding device is movable, said guide having a curvature whereby the folding device is caused to move rotarily, and means for moving said guide and folding device bodily preliminary to the rotary movement of the latter, whereby the edge of the stock to be folded is first wiped into an upright position and then bent over upon the body of the stock.

28. In a folding machine combined folding and feeding instrumentalities adapted to act upon a limited extent of the material to be folded at each operation, comprising a supporting member, a fold-turning member movable about said supporting member to fold the stock, into a position for gripping the folded stock, and mechanism for moving said members simultaneously when in gripping relation, for feeding the stock.

29. A machine for folding sheet material upon a line at a uniform distance from the edge thereof, comprising folding and gripping members arranged to act on a limited extent of the edge of the material, means for producing a relative movement between said members for turning and gripping a portion of the stock acted upon, feeding mechanism for moving said members in unison to feed the stock and for returning the members into position to grip a fresh portion of the stock, means for snipping the edge of the stock between the steps of the feed thereof, and mechanism operable at any instant for varying the extent of travel produced by said feeding means, whereby the cuts produced by said snipping means may be located sufficiently near to one another to produce a smooth fold at curved portions of the line of fold.

30. In a machine for folding the edges of sheet material, complemental folding and gripping members, means for moving one of said members around and over the other to fold and grip the stock, means for snipping the edge of the stock in advance of each action of said members, mechanism for reciprocating said members in unison in one direction when gripping the stock and in another direction when free from the stock, and means operable to vary the extent of travel of said members while the machine is in operation, whereby the cuts produced by such snipping means may be located closely together at curved portions of the stock and the feed may be accelerated when approximately straight parts of the stock are acted upon.

31. A machine for folding the edges of sheet material and particularly of parts of shoe uppers, comprising a pair of folding and gripping members adapted to act upon a limited extent of the stock, a snipping cutter beside said members, means for giving a succession of folding movements to such members, mechanism for causing said members to travel in unison between folding operations so as to feed the stock, and means for causing said cutter to snip the edge of the stock between feeding movements of the said members.

32. A machine for folding the edge of sheet material in a series of steps, comprising coöperating folding members arranged to act at any one time upon only a limited extent of the material, means for moving said members in unison between folding operations so as to feed the material, and a single snipping cutter arranged beside said folding members to snip the edge of the stock prior to the several folding operations.

33. A machine for folding the edge of sheet material in a series of steps, comprising coöperating folding members arranged to act at any one time upon only a limited extent of the material, means for moving said members in unison between folding operations so as to feed the material, a single snipping cutter arranged beside said folding members to snip the edge of the stock prior to the several folding operations, and mechanism for causing the extent of feeding movements of said members to be varied in the course of the operation of the machine, whereby the cuts may be located closely together at sharply curved portions of the material and the progress of the work may be accelerated over straighter portions of the stock.

34. A folding machine organized to form a continuous fold in a series of steps, comprising coöperating gripping members, one of which is movable from a position beside the other, wherein it underlies the stock, into a position wherein it is superposed upon the other and grips the stock, its path in moving from one position to the other being such as to fold over the overlying edge of the stock, mechanism for moving such member back and forth between such positions, mechanism for moving said members simultaneously in a direction transverse to the direction of folding movement while gripping the stock, and for returning them after release of the stock, whereby the stock is fed step by step between folding operations, and means for varying the extent of feeding travel.

35. A folding machine organized to form a continuous fold in a series of steps, comprising coöperating gripping members, one of which is movable from a position beside the other, wherein it underlies the stock, into a position wherein it is superposed upon the other and grips the stock, its path in moving from one position to the other being such as to fold over the overlying edge of the stock, mechanism for moving such member back and forth between such positions, mechanism for moving said members simultaneously in a direction transverse to the direction of folding movement while gripping the stock, and for returning them after release of the stock, whereby the stock is fed step by step between folding operations, said mechanism including an actuating lever and a driven lever engaged with said members, and an intermediate member engaged with both said levers and movable to vary the proportions of their engaging arms, whereby the extent of feeding travel is varied.

36. A folding machine organized to form a continuous fold in a series of steps, comprising coöperating gripping members, one of which is movable from a position beside the other, wherein it underlies the stock, into a position wherein it is superposed upon the other and grips the stock, its path in moving from one position to the other being such as to fold over the overlying edge of the stock, mechanism for moving such member back and forth between such positions, and mechanism for moving said members simultaneously in a direction transverse to the direction of folding movement while gripping the stock, and for returning them after release of the stock, whereby the stock is fed step by step between folding operations, said mechanism comprising an operating lever, a driven lever connected with said gripping members, and a connecting device between the two levers, said connecting device being movable with respect to the pivots of the levers to lengthen the arm of either and simultaneously shorten the engaging arm of the other, whereby the amplitude of oscillation of the driven lever and thereby the extent of each step of the feed may be varied.

37. A folding machine organized to form a continuous fold in a series of steps, comprising coöperating gripping members, one of which is movable from a position beside the other, wherein it underlies the stock, into a position wherein it is superposed upon the other and grips the stock, its path in moving from one position to the other being such as to fold over the overlying edge of the stock, mechanism for moving such member back and forth between such positions, and mechanism for moving said members simultaneously in a direction transverse to the direction of folding movement while gripping the stock, and for returning them after release of the stock, whereby the stock is fed step by step between folding operations, said mechanism comprising the lever engaged with said gripping members so as to reciprocate the latter when oscillated, a driving lever having a slotted arm overlapping a slotted arm of the first-named lever, a pin entering the slots of both arms for transmitting movement from one lever to the other, and means operable by the machine operator while the machine is in motion for shifting said pin in such slotted arms and thereby increasing the effective length of one arm while decreasing the effective length of the other, thus varying the length of the feeding steps.

38. In a folding machine a slide having provisions for supporting and grasping work, a folder connected to said slide so as to be movable therewith and being mounted also for movement transverse to that of the slide, a lever connected to said slide for vibrating the latter, a driving lever, said levers having overlapping arms, a connecting pin engaged in the slots of said arms, a link engaged with said pin, a rocker connected to said link and movable in the general direction of said slotted arms, whereby the pin may be shifted to alter the effective lengths of the arms, and means controlled by the operator of the machine for swinging said rocker.

39. A folding machine organized to form a continuous fold in a series of steps, comprising coöperating gripping members, one of which is movable from a position beside the other, wherein it underlies the stock, into a position wherein it is superposed upon the other and grips the stock, its path in moving from one position to the other being such as to fold over the overlying edge of the stock, mechanism for moving such member back and forth between such positions, mechanism for moving said members simultaneously in a direction transverse to the direction of folding movement while gripping the stock, and for returning them after release of the stock, whereby the stock is fed step by step between folding operations, said mechanism including complemental levers and a connecting member shiftable to vary the effective lengths of the connected arms on said levers, means adapted to be operated by the machine operator for moving said connection in the direction necessary to increase the length of the feeding steps, and automatic means for moving said connection in the feed-shortening direction.

40. A folding machine organized to form a continuous fold in a series of steps, comprising coöperating gripping members, one of which is movable from a position beside the other, wherein it underlies the stock, into a position wherein it is superposed upon the other and grips the stock, its path in moving from one position to the other being such as to fold over the overlying edge of the stock, mechanism for moving such member back and forth between such positions, mechanism for moving said members simultaneously in a direction transverse to the direction of folding movement while gripping the stock, and for returning them after release of the stock, whereby the stock is fed step by step between folding operations, said mechanism including complemental levers and a connecting member shiftable to vary the effective lengths of the connected arms on said levers, means adapted to be operated by the machine operator for moving said connection in the direction necessary to increase the length of the feeding steps, automatic means for moving said connection in the feed-shortening direction, and an adjustably located stop for limiting the action of said automatic means and thus defining the minimum feed.

41. A folding machine organized to form a continuous fold in a series of steps, comprising coöperating gripping members, one of which is movable from a position beside the other, wherein it underlies the stock, into a position wherein it is superposed upon the other and grips the stock, its path in moving from one position to the other being such as to fold over the overlying edge of the stock, mechanism for moving such member back and forth between such positions, mechanism for moving said members simultaneously in a direction transverse to the direction of folding movement while gripping the stock, and for returning them after release of the stock, whereby the stock is fed step by step between folding operations, a snipping cutter arranged adjacent to said members for cutting the edge of the material prior to each operation of said gripping members, an actuator for said cutter, mechanism for disconnecting the cutter from said actuator, and a single device controlled by the operator of the machine for increasing the extent of the feeding movement of said gripping members and operating said cutter-disconnecting mechanism.

42. In a folding machine of the character indicated a folder or fold-turning device, a snipping knife, a reciprocatively guided carrier for said knife, a reciprocating actuator for the fold-turning device engaged with said carrier, and means for disengaging said actuator from said knife carrier while the machine continues in full operation, to permit folding without snipping.

43. In a folding machine of the character indicated a folder or fold-turning device, a reciprocating actuator for the same, a slitting knife beside said folder, an intermediate connector between said knife and folder actuator whereby said knife is also operated by said actuator, and mechanism for disengaging said connection to render said knife inoperative while the folder continues in operation.

44. In a folding machine a reciprocating folding device, a reciprocable snipping knife, a carrier for the same, a reciprocating actuator connected to and moving with said folding device, said knife carrier and actuator having adjacent wings or arms, a block carried by one of said wings adapted to engage the other and transmit motion from said actuator to said knife carrier, and means controlled by the operator of the machine for moving said block out of engagement with one of the wings, whereby said knife is disabled while the folding device remains in operation.

45. In a folding machine a reciprocating knife-carrying bar, a slitting knife secured thereto, an actuator guided to reciprocate beside said bar, a collar on said bar, said collar and actuator having projections arranged side by side, a rod carried by one of said projections having a head movable into engagement with the other projection, whereby movement is transmitted from the actuator to the knife carrier, a stationary bar in line with said rod and having an end surface coextensive with the travel of said rod and in close proximity to the end of the latter, and mechanism controlled by the operator of the machine for forcing said bar against said rod and thereby disengaging the head from one of said projections.

46. In a machine of the character described a base, a work-supporting table upon said base, an arm overhanging the base, a bar guided on the end of said arm to reciprocate toward and from said table and having a stud extending parallel with the plane of the table, a guide or holder for a folding device suspended from said stud and passing through an aperture in the table, a slide mounted in guideways beneath said table and also having an aperture through which said guide or holder passes, a guide rod extending from said slide parallel to said reciprocating bar, a sleeve on said guide embracing said post and adapted to slide thereon, a folder mounted to slide upon a curved guideway on said holder, and mechanism connected with said folder for moving the same along its guide.

47. A machine for folding over the edge of sheet material, comprising snipping means arranged to make a succession of incisions in the material extending inwardly from the edge, thereby forming tongues, coöperating folding devices constructed to act on a limited extent of the material arranged and located near said snipping means and mechanism for actuating said folding devices to double back each tongue as soon as formed and before another tongue has been made by a subsequent action of the snipping means.

48. A folding machine comprising a cutter, means for operating said cutter to make a series of cuts, extending inward from the edge of the material to be folded, as the material is fed past the same, a translatively and rotatively movable folder, and mechanism for causing said folder to double back the tongues formed in the edge of the material, said folder being located close beside said cutter, whereby the tongue formed by the last cut of the latter is folded over by the folder prior to the next feed of the material.

49. A folding machine comprising a cutter, means for operating said cutter to make a series of cuts, extending inward from the edge of the material to be folded, as the material is fed past the same, and a folder arranged close beside said cutter at a less distance therefrom than the width of any single tongue formed by a cut of the latter; and being movable toward and from the same to feed the stock.

50. A machine for folding the edge of sheet material in a series of steps, comprising a folding device constructed to act on a limited extent of the edge to be folded and to which such edge is fed progressively step by step, and a cutter located in the line of feed of the stock and at a less distance from said folder than the length of a single step of the feed.

51. In a machine for folding the edges of sheet material, a support for the material, a folding device, and a holder for said folding device by which the latter is constrained to move partly around said support and toward the supporting surface thereof, said folding device being yieldingly mounted upon said holder to accommodate stock of varying thicknesses.

52. In a machine for folding the edges of sheet material, a support for the material, a folding device including a spring-projected block or clamp, and a holder for said folding device, by which the latter is constrained to move partly around said support and toward the supporting surface thereof, said block or clamp being enabled to yield when pressed toward the support, so as to accommodate stock of various thicknesses.

53. A folding machine comprising a support for the stock to be folded, a turning device normally located beside said support so that the stock on the support may project over the turning device, mechanism for moving said turning device as a whole transversely of the plane of the support to bend up the edge of the stock, and mechanism for rotatively moving said turning device about an axis approximately in the plane of the support, whereby the folded edge is laid flat against the stock.

54. A step-by-step folding machine having, in combination, a cutter for slitting the margin of a piece of material, a folder located at one side of the cutter, a presser located at one side of the folder, a creaser up and over the edge of which the folder moves, means for actuating said cutter, folder, creaser and presser, and means for feeding the material.

55. A machine of the class described having, in combination, means for feeding a piece of work into position to have its margin folded, slitting means adapted to be thrown into and out of operation, means for varying the rate of feed during the operation of the machine and a member movable by manipulation of said last-named means to control the operativeness of said slitting means.

56. A machine of the class described having, in combination, means for feeding a piece of work into position to have its margin folded, slitting means adapted to be thrown into and out of operation, means for varying the rate of feed during the operation of the machine and a member movable by manipulation of said last-named means to throw the slitting means out of operation when the rate of feed is increased.

57. A machine of the class described having, in combination, means for feeding a piece of work intermittently into position to have its margin folded, slitting means adapted to be thrown into and out of operation, manually controlled means for varying the extent of the intermittent feed movements during the operation of the machine, and a member movable by manipulation of said last-named means to vary said extent for throwing out said slitting means.

58. A machine of the class described having, in combination, means for feeding a piece of work intermittently into position to have its margin folded, slitting means adapted to be thrown into and out of operation, manually controlled means for varying the extent of the intermittent feed movements during the operation of the machine, and a member movable by manipulation of said last-named means to vary said extent for controlling the operativeness of said slitting means.

59. A machine of the class described having, in combination, means for feeding a piece of work intermittently into position to have its margin folded, slitting means adapted to be thrown into and out of operation, manually controlled means for varying the extent of the intermittent feed movements during the operation of the machine, and a member movable by manipulation of said last-named means to increase the extent of the intermittent feed movements for throwing out said slitting means.

60. A folding machine comprising a combined fold presser and feed member, an anvil between which and said member the folded margin is gripped during the pressing and feeding operations, mechanism for causing said member to press the folded margin upon and release it from said anvil, mechanism for moving said member and anvil in unison back and forth while respectively in gripping and non-gripping positions to feed the stock in a series of steps, and mechanism for varying the rate of feed while the machine is in operation.

In testimony whereof I have affixed my signature, in presence of two witnesses.

PERLEY R. GLASS.

Witnesses:
ARTHUR H. BROWN,
P. W. PEZZETTI.